(12) United States Patent
Smith et al.

(10) Patent No.: US 7,736,526 B2
(45) Date of Patent: Jun. 15, 2010

(54) METHOD OF FILTERING PHOSPHATE UTILIZING A ROTARY TABLE FILTER OR HORIZONTAL TABLE FILTER

(75) Inventors: Gary Lee Smith, Clyde, NC (US); Jimmy Dwayne Jackson, Sumter, SC (US)

(73) Assignee: Thompson Industrial Services, LLC, Sumter, SC (US)

( * ) Notice: Subject to any disclaimer, the term of this patent is extended or adjusted under 35 U.S.C. 154(b) by 0 days.

(21) Appl. No.: 12/285,415

(22) Filed: Oct. 3, 2008

(65) Prior Publication Data

US 2010/0084351 A1    Apr. 8, 2010

(51) Int. Cl.
*B01D 37/00* (2006.01)
*C01B 25/222* (2006.01)
*C01B 25/234* (2006.01)
*B01D 33/15* (2006.01)

(52) U.S. Cl. .................. 210/780; 210/391; 210/406; 210/409; 423/320; 423/321.1

(58) Field of Classification Search ............ None
See application file for complete search history.

(56) References Cited

U.S. PATENT DOCUMENTS

| | | | | |
|---|---|---|---|---|
| 820,560 A * | 5/1906 | Evans | ............ | 210/263 |
| 1,219,796 A * | 3/1917 | Atkins | ............ | 210/360.2 |
| 1,804,934 A * | 5/1931 | Hoyt | ............ | 210/327 |
| 2,588,912 A * | 3/1952 | Denhard | ............ | 210/396 |
| 2,604,995 A * | 7/1952 | Maslin | ............ | 210/396 |
| 2,716,494 A * | 8/1955 | Hursh | ............ | 210/396 |
| RE24,150 E * | 5/1956 | Delruelle | ............ | 210/203 |
| 2,798,612 A * | 7/1957 | Crumb | ............ | 210/393 |
| 2,839,194 A * | 6/1958 | Lopker et al. | ............ | 210/772 |
| 2,853,193 A * | 9/1958 | Crumb | ............ | 210/328 |
| 2,937,069 A * | 5/1960 | Zoellner | ............ | 8/137 |
| 3,075,646 A * | 1/1963 | Giesse | ............ | 210/391 |
| 3,080,063 A * | 3/1963 | Engwall et al. | ............ | 210/330 |
| 3,138,554 A * | 6/1964 | Klinger et al. | ............ | 210/393 |
| 3,169,706 A * | 2/1965 | Ross | ............ | 239/752 |
| 3,216,576 A * | 11/1965 | Roos | ............ | 210/328 |
| 3,262,574 A * | 7/1966 | Parmentier | ............ | 210/393 |
| 3,361,262 A * | 1/1968 | Orr et al. | ............ | 210/330 |
| 3,397,783 A * | 8/1968 | Pearce | ............ | 210/780 |
| 3,397,787 A * | 8/1968 | Mini | ............ | 210/139 |
| 3,416,668 A * | 12/1968 | Lobley | ............ | 210/203 |
| 3,425,799 A * | 2/1969 | Hazen et al. | ............ | 423/320 |
| 3,469,703 A * | 9/1969 | Parmentier | ............ | 210/393 |

(Continued)

OTHER PUBLICATIONS

Chenier, Philip, J. (2002). Survey of Industrial Chemistry (3rd Edition). (Chapter 2; pp. 23-40).*

*Primary Examiner*—Robert James Popovics
(74) *Attorney, Agent, or Firm*—Finnegan, Henderson, Farabow, Garrett & Dunner, L.L.P.

(57) ABSTRACT

The present disclosure is directed to a filter support having a surface with a plurality of perforations therein. At least one spray bar may be substantially fixed adjacent to the surface of the filter support. A spray bar may include a plurality of nozzles for directing a pressured fluid toward the filter support. The filter support may further include a motor for causing the filter support to move in a cyclical manner while the spray bar directs pressurized fluid toward the filter support.

22 Claims, 6 Drawing Sheets

U.S. PATENT DOCUMENTS

| | | | | |
|---|---|---|---|---|
| 3,478,885 | A | * | 11/1969 | Jackson .................... 210/194 |
| 3,485,375 | A | * | 12/1969 | Lee .......................... 210/330 |
| 3,501,003 | A | * | 3/1970 | Parmentier ................. 210/777 |
| 3,521,751 | A | * | 7/1970 | Holthuis ..................... 210/797 |
| 3,587,862 | A | * | 6/1971 | Lee .......................... 210/330 |
| 3,608,721 | A | * | 9/1971 | Lopker ....................... 210/772 |
| 3,715,191 | A | * | 2/1973 | Rushton et al. ............. 422/232 |
| 3,819,810 | A | * | 6/1974 | Goldstein ................. 423/321.1 |
| 3,911,079 | A | * | 10/1975 | Gielly ..................... 423/157.4 |
| 3,919,088 | A | * | 11/1975 | Doncer et al. .............. 210/402 |
| 3,957,636 | A | * | 5/1976 | Arvanitakis ................ 210/739 |
| 4,017,399 | A | * | 4/1977 | Lopker ....................... 210/408 |
| 4,110,422 | A | * | 8/1978 | Hill .......................... 423/317 |
| 4,136,028 | A | * | 1/1979 | Toivonen .................... 210/780 |
| 4,136,199 | A | * | 1/1979 | Mills ...................... 423/321.1 |
| 4,139,465 | A | * | 2/1979 | Nordengren ................. 210/772 |
| 4,164,550 | A | * | 8/1979 | Hill ....................... 423/321.1 |
| 4,230,575 | A | * | 10/1980 | Lizee ......................... 210/780 |
| 4,235,854 | A | * | 11/1980 | Smith et al. ................. 423/320 |
| 4,243,643 | A | * | 1/1981 | Mills .......................... 423/319 |
| 4,263,148 | A | * | 4/1981 | Symens et al. .............. 210/705 |
| 4,276,166 | A | * | 6/1981 | Muller et al. ................ 210/327 |
| 4,299,804 | A | * | 11/1981 | Parks et al. .............. 423/321.1 |
| 4,303,524 | A | * | 12/1981 | Richards et al. ............. 210/406 |
| 4,305,820 | A | * | 12/1981 | Stahl et al. .................. 210/327 |
| 4,313,919 | A | * | 2/1982 | Richards et al. .......... 423/321.1 |
| 4,332,779 | A | * | 6/1982 | Thibodeau et al. ........ 423/321.2 |
| 4,376,756 | A | * | 3/1983 | Mills et al. .................. 423/317 |
| 4,391,706 | A | * | 7/1983 | Steinkraus .................. 210/232 |
| 4,443,421 | A | * | 4/1984 | Hollifield et al. ......... 423/321.1 |
| 4,496,462 | A | * | 1/1985 | Steinkraus .................. 210/232 |
| 4,521,392 | A | * | 6/1985 | Mills et al. .................. 423/317 |
| 4,539,114 | A | * | 9/1985 | Mention et al. ............. 210/330 |
| 4,547,295 | A | * | 10/1985 | Carr et al. .................... 210/777 |
| 4,592,901 | A | * | 6/1986 | Smith et al. ................. 423/320 |
| 4,639,315 | A | * | 1/1987 | Fuchs et al. .............. 210/333.1 |
| 4,675,107 | A | * | 6/1987 | Chamberlain ............... 210/232 |
| 4,721,566 | A | * | 1/1988 | Chamberlain et al. ....... 210/328 |
| 4,752,390 | A | * | 6/1988 | Martin et al. ............... 210/188 |
| 4,759,913 | A | * | 7/1988 | Headington .................. 423/10 |
| 4,826,607 | A | * | 5/1989 | Pearce ........................ 210/770 |
| 4,857,211 | A | * | 8/1989 | Nineuil et al. .............. 210/797 |
| 4,886,608 | A | * | 12/1989 | Cook ......................... 210/785 |
| 4,975,189 | A | * | 12/1990 | Liszka ....................... 210/327 |
| 4,994,248 | A | * | 2/1991 | Slater et al. ................. 423/320 |
| 5,084,174 | A | * | 1/1992 | Perala et al. ................ 210/331 |
| 5,149,448 | A | * | 9/1992 | Mattelmaki ................. 210/784 |
| 5,360,541 | A | * | 11/1994 | Gerakios .................... 210/232 |
| 5,470,472 | A | * | 11/1995 | Baird et al. ................. 210/391 |
| 5,624,571 | A | * | 4/1997 | Bennett ...................... 210/741 |
| 5,738,787 | A | * | 4/1998 | Alexander et al. .......... 210/498 |
| 5,759,397 | A | * | 6/1998 | Larsson et al. .............. 210/331 |
| 5,851,392 | A | * | 12/1998 | Brady, Jr. ................... 210/396 |
| 5,897,788 | A | * | 4/1999 | Ketolainen et al. .......... 210/784 |
| 5,900,158 | A | * | 5/1999 | Ruokolainen et al. ....... 210/772 |
| 5,968,372 | A | * | 10/1999 | Martensson et al. ......... 210/741 |
| 6,063,294 | A | * | 5/2000 | Martensson et al. ......... 210/739 |
| 6,454,940 | B1 | * | 9/2002 | Walters ...................... 210/232 |
| 6,596,166 | B1 | * | 7/2003 | Danielsson et al. ......... 210/324 |
| 6,833,077 | B2 | * | 12/2004 | Flanagan .................... 210/772 |
| 7,473,375 | B2 | * | 1/2009 | Stoerzer ..................... 210/791 |
| 7,635,785 | B2 | * | 12/2009 | Bauer et al. .................... 562/8 |
| 2002/0166821 | A1 | * | 11/2002 | Flanagan .................... 210/784 |
| 2002/0166822 | A1 | * | 11/2002 | Flanagan .................... 210/784 |
| 2004/0089599 | A1 | * | 5/2004 | Kurowski ................... 210/330 |
| 2005/0137418 | A1 | * | 6/2005 | Bauer et al. .................... 562/8 |
| 2008/0146708 | A1 | * | 6/2008 | Bauer et al. ................. 524/147 |
| 2008/0188598 | A1 | * | 8/2008 | Bauer et al. ................. 524/147 |
| 2009/0020469 | A1 | * | 1/2009 | Pitre ......................... 210/232 |

\* cited by examiner

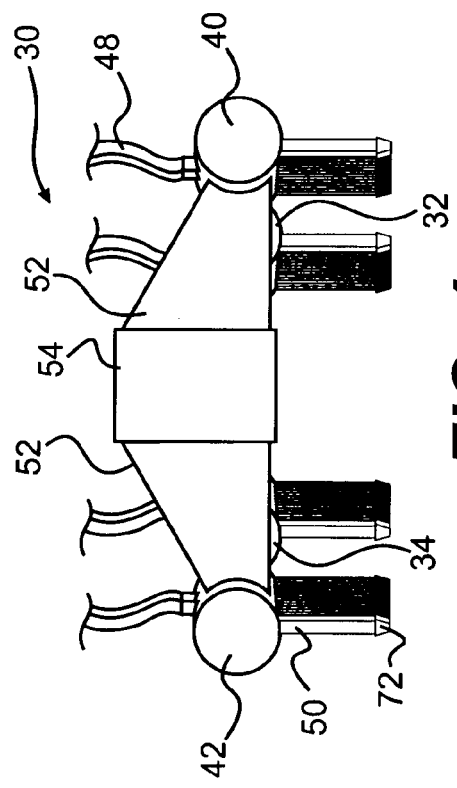
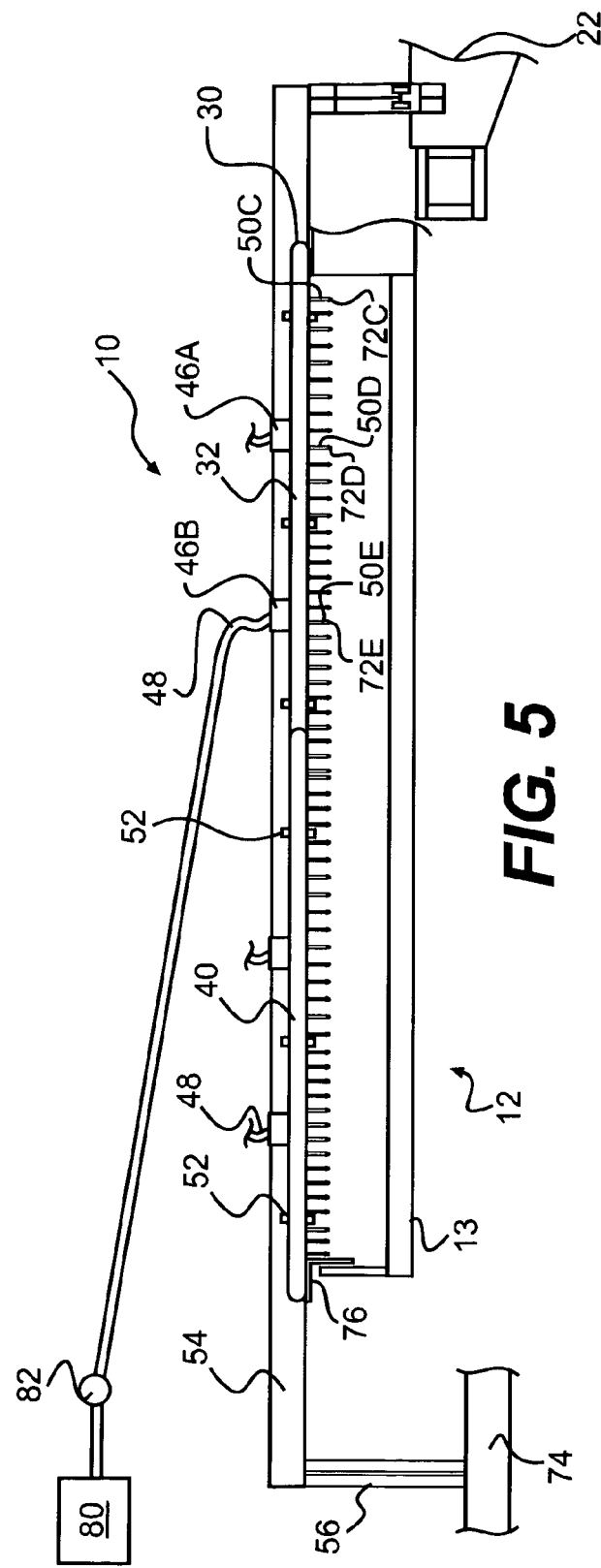
FIG. 4
FIG. 5

METHOD OF FILTERING PHOSPHATE UTILIZING A ROTARY TABLE FILTER OR HORIZONTAL TABLE FILTER

FIELD OF THE INVENTION

The present disclosure relates generally to filtering apparatuses and, may involve phosphate filtering apparatuses.

BACKGROUND OF THE INVENTION

Phosphoric acid has a variety of industrial, medical, and other uses. It may be produced with a "wet process," using various acids to dissolve phosphate in source rock. The three types of acids typically used to accomplish the dissolution are: nitric, hydrochloric and sulfuric. Phosphates may be found in two rock types, igneous and sedimentary. Phosphate-bearing sedimentary rock is typically composed primarily of Francolite: $Ca_{10}(PO_4)_{6-x}(CO_3)_x(F,OH)_{2+x}$. The phosphate in the rock may require concentrating before it is of marketable quality. Reacting the phosphates in the rock with sulfuric acid may yield phosphoric acid and calcium sulfate (Gypsum) $[Ca_3(PO_4)_2 + 3H_2SO_4 \rightarrow 2H_3PO_4 + 3CaSO_4]$.

The gypsum may precipitate out of the solution as an insoluble salt that may be removed by filters to prevent the gypsum salt from coating the phosphate rock thereby inhibiting or halting the reactive process. Various types of filters may be used to remove the gypsum from the phosphate rock/acid solution; including belt filters, table filters, and tilting pan filters. Such filters may use a cloth filter to trap the gypsum particles as the liquid is pulled or drawn through the cloth by a vacuum process. The cloth filter may be removed and easily cleaned or replaced; however, it may be difficult to clean the filter supporting structure during operations. Such cleaning difficulty may result from gypsum crystal growth and solids plugging the openings through which the vacuum is applied. Cleaning may be beneficial since clogged openings in the filter support may reduce the efficiency of the filter during operation.

A current method of cleaning the filter support structure involves having at least one person manually direct a pressurized cleaning fluid, such as water, into contact with the filter structure. While this method may provide some level of cleaning, it also may consume a large amount of time and manpower; the operators of the associated cleaning apparatus may fail to clean portions of the filter structure; and the amount and time of contact of the water with the filter structure may be inconsistent, leading to non-uniform results.

SUMMARY OF THE INVENTION

In one aspect, the present disclosure is directed to a method of operating a phosphate filtering apparatus. The method may include providing a filtering apparatus including a movable filter support having a plurality of openings therein and providing at least one spray bar disposed in a substantially fixed orientation adjacent a surface of the filter support. The method may further include installing a filter on the movable filter support and exposing the filter to a mixture of phosphates and sulfuric acid, thereby resulting in phosphoric acid and calcium sulfate. The method may still further include drawing a vacuum on one side of the movable filter support opposite the mixture to draw the phosphoric acid through the filter. Drawing a vacuum on one side of the movable filter support may result in calcium sulfate accumulation in the openings of the movable filter support. The method may still further include removing the filter from the filter support and causing the filter support to move in a cyclical manner while the filter is removed from the filter support. During the cyclical motion, a plurality of nozzles in the spray bar, may spray pressurized fluid toward the surface of the filter support. This may occur through multiple cycles of movement such that the spraying results in a sweeping motion across the surface of the filter support. After a majority of the openings in the filter support are substantially free of calcium sulfate blockage, the spraying may be terminated.

In another aspect, the present disclosure is directed to a movable filter support having a surface with a plurality of perforations therein. The filter support may include at least one spray bar substantially fixed adjacent to the surface of the movable filter support. The at least one spray bar may include a plurality of nozzles connected to the at least one said spray bar with the nozzles being disposed to direct a pressured fluid toward the movable filter support. The filter support may further include a motor for causing the filter support to move in a cyclical manner while the at least one spray bar directs pressurized fluid toward the movable filter support through the nozzles.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 4 is an end view of the exemplary filtering apparatus of FIG. 1;

FIG. 5 is a side view of the exemplary filtering apparatus of FIG. 1;

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
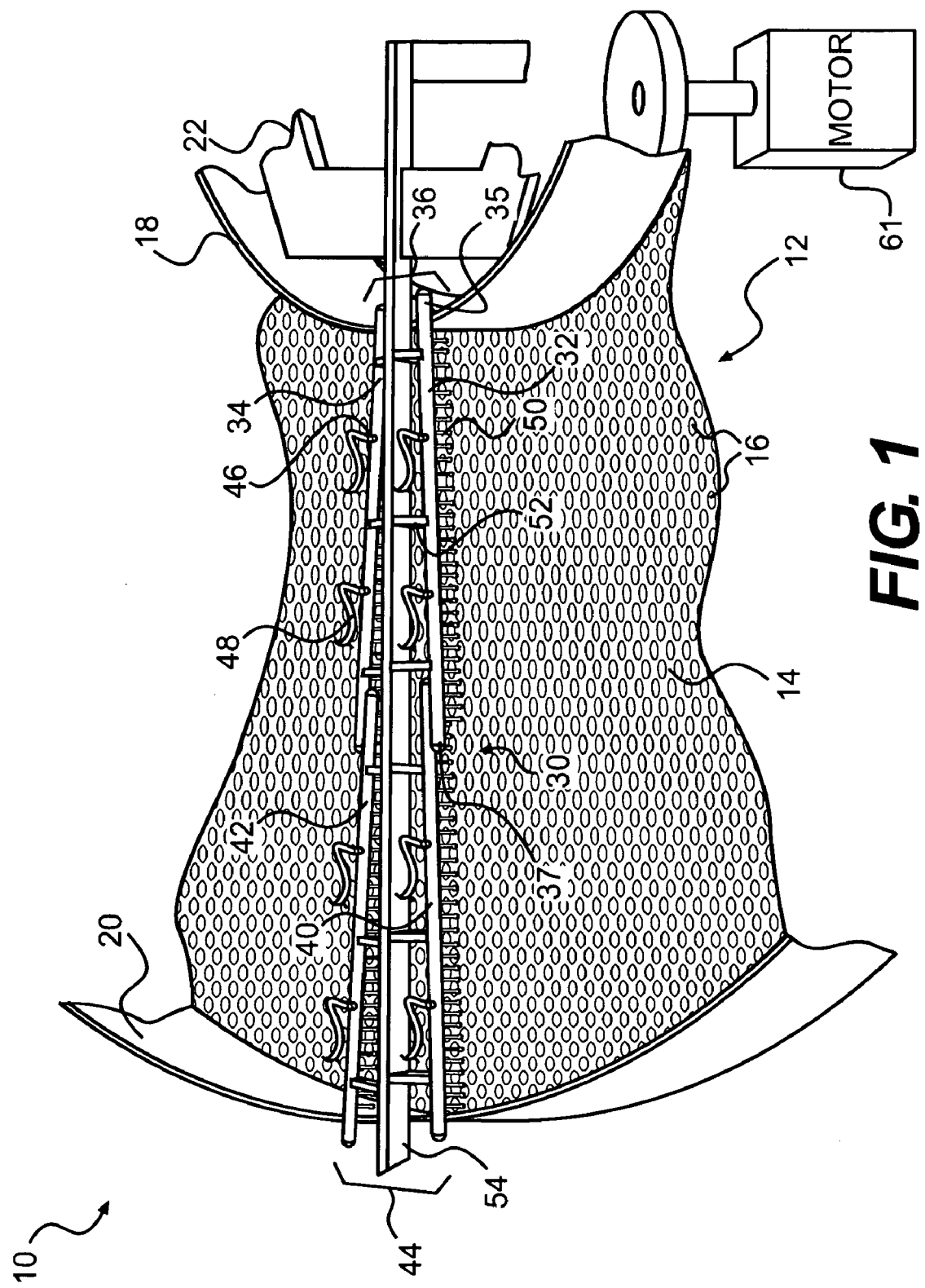
FIG. 1 is a partial cutaway in perspective view of one exemplary filtering apparatus in accordance with the invention.

FIG. 1 illustrates a portion of an exemplary phosphate filtering apparatus 10. Phosphate filtering apparatus 10 may include a filter support 12. Filter support 12 is described herein as a table filter for exemplary purposes only. However, it is contemplated that filter support 12 may embody any other type of filter structure, such as, for example, tilting pan filters or belt filters. Filter support 12 may be generally round in shape and include a surface 14, configured to support a filter medium (not shown), and a plurality of openings 16, configured to allow fluid to pass or be drawn through filter support 12. Surface 14 and openings 16 of filter support 12 may be disposed between and supported by peripheral walls. In FIG. 1, for example inside wall 18 may define an inner radius of a circular filter support frame, and an outside wall 20 may define an outer radius of the circular filter support frame. Filter support 12 may be configured to rotate during filtering operations and cleaning operations, such as through the operation of a motor 61, schematically illustrated in FIG. 1. Filter support 12 may also include a center 22 that may be stationary. The filter medium may be any filter medium suitable for the intended application, such as, for example, a cloth filter medium or any other medium known in the art. The filter may rest on filter support 12 and may be secured to filter support 12 with a plurality of clips (not shown).

In accordance with the invention, phosphate filtering apparatus 10 may include a spray bar system 30. A spray bar may be any conduit, regardless of shape, configured to deliver a fluid to surface 14 and openings 16 of filter support 12. By way of example, the spray bar may be generally cylindrical, rectangular, or of other tubular cross-sectional shape. The size of the spray bay may be uniform throughout the spray bar, may taper to or from one end, may taper to or from both ends, or may be of non-uniform variable dimension. The spray bar may be made of steel, other metal, composite, iron or metal alloy, or any other suitable material known in the art. In one embodiment, the spray bar may be constructed of schedule 160 SA 106-B carbon steel. Spray bar system 30 may be configured with at least one spray bar, in many alternate ways. For example it could include a single spray bar, two spray bars forming a pair, a plurality of pairs of spray bars, unpaired spray bars, any combination of the above, or any other configuration for delivering fluid to a surface 14 and openings 16 of filter support 12. In FIG. 1, for example, spray bar system 30 may include a first spray bar 32 and a second spray bar 34. First spray bar 32 and second spray bar 34 may combine to form a first pair of spray bars 36. Spray bar system 30 may also include a third spray bar 40 and a fourth spray bar 42. Third spray bar 40 and fourth spray bar 42 may combine to form a second pair of spray bars 44.

Second spray bar 34, third spray bar 40, and fourth spray bar 42 may contain similar components as those described below for first spray bar 32. First spray bar 32 may have a inner end 35, facing inside wall 18, and an outer end 37, facing to outside wall 20. First spray bar 32 may include at least one fluid inlet 46 configured to receive a fluid from a supply line 48. In FIG. 1, first spray bar 32 is depicted as having two fluid inlets 46. Supply line 48 may be configured to deliver any fluid suitable for cleaning filter support 12, such as, for example, water or other cleaning solution or chemical. First spray bar 32 may also include a plurality of nozzles 50 configured to direct fluid into contact with filter support 12. In one sense, nozzles 50 may simply be perforations in the wall of first spray bar 32. Alternatively, nozzles 50 may include additional structure, as generally depicted in FIG. 1. This additional structure may include, for example, a separate spray head nozzle directly mounted to the first spray bar 32 or extending from the first spray bar 32 at the end of an extension conduit. Nozzles 50 may be further located to direct fluid into contact with filter support 12 at an angle perpendicular to surface 14. It is also contemplated that nozzles 50 may be directed towards filter support 12 at other angles to effect cleaning of the filter support 12. First spray bar 32 may include a plurality of supports 52, configured to substantially fix first spray bar 32 adjacent surface 14. This may be accomplished, for example, by mounting the supports to an elongated support beam 54, extending across a portion of surface 14. Depending on the materials used, the substantially fixed spray bar may deform, flex, or otherwise shift during use.

Figure 2:
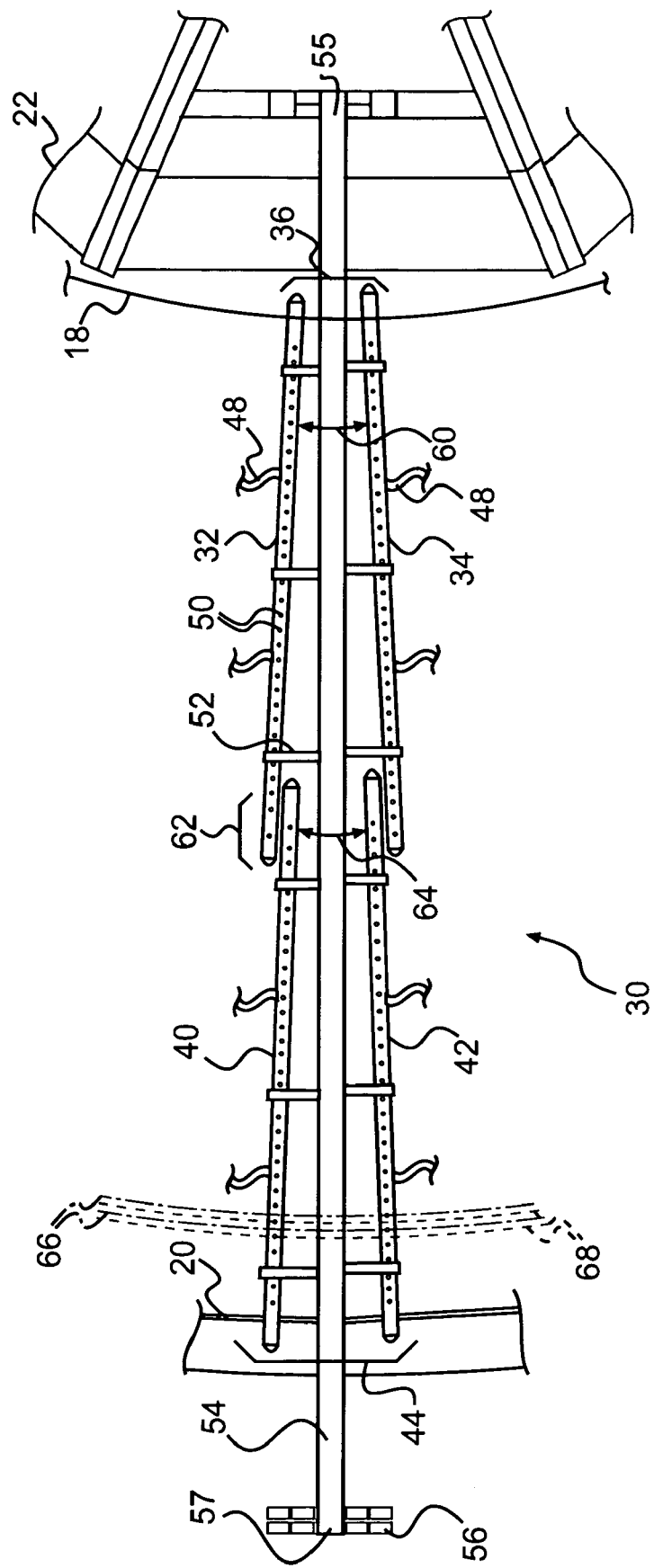
FIG. 2 is a bottom view of the filtering apparatus of FIG. 1.

As can be seen in FIG. 2, support beam 54 may have an inner end 55 and an outer end 57. Inner end 55 may be fixed to center support 22 and outer end 57 may be fixed to an outer support 56. Outer support 56 may embody a stationary part of phosphate filtering apparatus 10, a stationary part of a facility that houses phosphate filtering apparatus 10, or another stationary object, not related to filter support 12 or phosphate filtering apparatus 10, suitable for mounting support beam 54.

First pair of spray bars 36 may extend radially outward from center 22 at a first reflex angle 60. Exemplary first reflex angle 60 is depicted in FIG. 2 as approximately 6°. The outer ends 37 of first pair of spray bars 36 may also extend beyond the inner ends 35 of second pair of spray bars 44 to form an overlap 62. Second pair of spray bars 44 may extend outward from center 22 at a second reflex angle 64. Exemplary second reflex angle 64 is depicted in FIG. 2 as approximately 4°. First reflex angle 60 and second reflex angle 64 may vary depending on the particular configuration. In addition, it is contemplated that the spray bars, if substantially straight, may be disposed in a generally parallel orientation. The spray bars of the invention need not be substantially straight. They can take on different shapes that include bends and/or curves.

Nozzles 50 may be located on first spray bar 32 and third spray bar 40 to direct fluid into contact along a first set of radii 66. Nozzles 50 may be located on second spray bar 34 and fourth spray bar 42 to direct fluid into contact along a second set of radii 68. FIG. 2 also depicts other exemplary details of spray bar system 30, such as, for example, the locations of supports 52. The details depicted in FIG. 2 are for exemplary purposes only and may be modified without departing from the scope of this disclosure.

Figure 3:
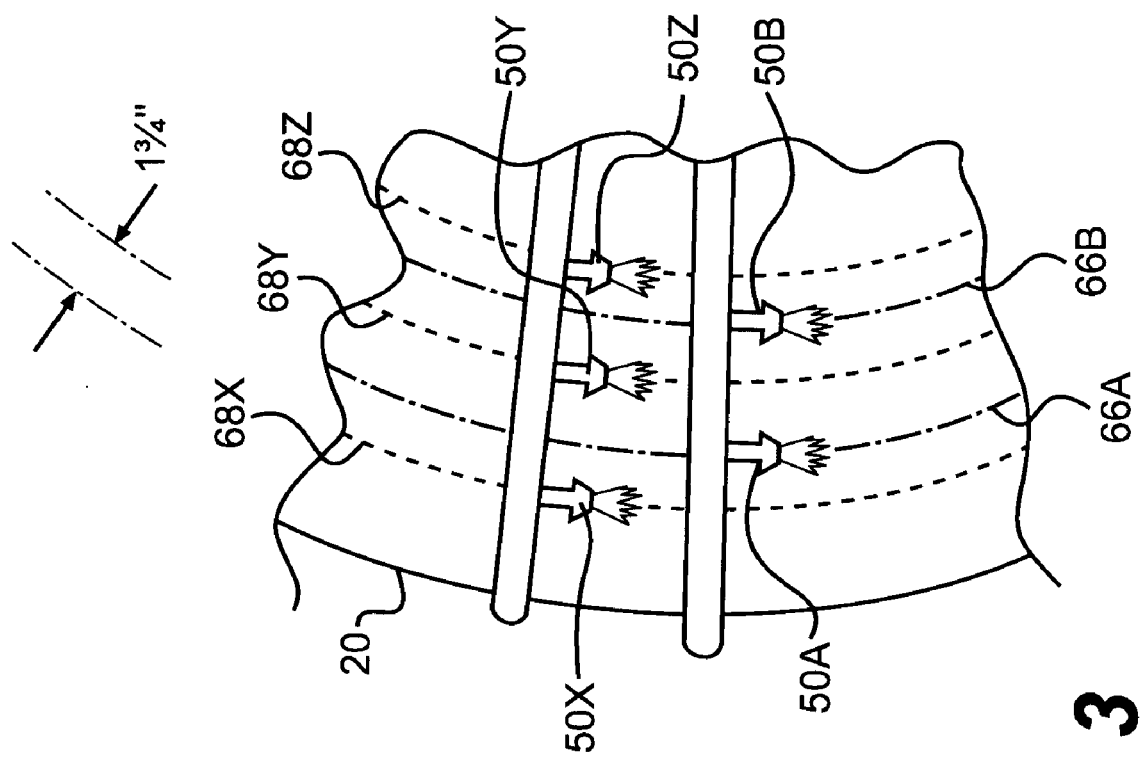
FIG. 3 is a schematic depiction of a few spray arcs that may be achieved with the filter apparatus of FIG. 1.

FIG. 3 depicts a detailed view of the contact the fluid from nozzles 50 may make with filter support 12. Nozzle 50X may direct fluid into contact with filter support 12 along radius 68X. Nozzle 50A may direct fluid into contact with filter support 12 along radius 66A. Nozzle 50Y may direct fluid into contact with filter support 12 along radius 68Y. Nozzle 50B may direct fluid into contact with filter support 12 along radius 66B. Nozzle 50Z may direct fluid into contact with filter support 12 along radius 68Z. Radius 66A may pass between nozzle 50x and nozzle 50Y; radius 66B may pass between nozzle 50Y and nozzle 50Z; and radius 68Y may pass between nozzle 50A and nozzle 50B. In this manner, fluid from first spray bar 32 and third spray bar 40 may contact filter support 12 in different locations than fluid from second spray bar 34 and fourth spray bar 42. In one embodiment, radius 68X may be spaced approximately 1¾ inches from radius 66A. This results in a spacing of approximately 3½ inches between each nozzle 50 on a spray bar. Depending on the configuration, the spacing can vary without departing from the spirit of the invention. In one embodiment, the spray bars may have a length of approximately 11 feet, and may include 32 or 33 nozzles 50. Of course, the invention may be used with spray bars over seven feet in length, or any other size, depending on the particulars of the application. The number of bars and nozzles may be a function of the filter support size and orientation.

FIG. 4 depicts an end view of spray bar system 30. Supports 52 may be configured to support the weight of first spray bar 32, second spray bar 34, third spray bar 40, and fourth spray bar 42. As depicted in FIGS. 2 and 5, each spray bar may have three supports 52. It is contemplated that more or less supports may be used depending on the material and length of the bar, the number of bars, the material of the support, or any other factor that may effect the amount or type of support necessary.

Fluid may be pressurized and delivered, via supply lines 48, to first spray bar 32, second spray bar 34, third spray bar 40, and fourth spray bar 42. As fluid exits nozzles 50, the fluid may cause a force on the spray bars in the direction opposite of the direction of the fluid flow. Supports 52 may be configured to counter these opposite forces and substantially maintain the position of first spray bar 32, second spray bar 34, third spray bar 40, and fourth spray bar 42 when fluid is being directed into contact with filter support 12.

As shown in FIG. 4, each of nozzles 50 may include a nozzle head 72. Nozzle head 72 may embody any number of configurations to regulate and direct the flow of the fluid into contact with filter support 12. For example there may be a first pressure drop from a fluid inlet 46A to a nozzle head 72C on a nozzle 50C, and there may be a second pressure drop, that may be lower than the first pressure drop, from fluid inlet 46A to a nozzle head 72D on a nozzle 50D. As a result, a nozzle head 72E may be similar to nozzle head 72D due to the proximity of nozzle head 72E to a fluid inlet 46B. However, nozzles farther from a source of pressurized fluid (e.g. 50C, 72C) may have different configurations or shapes if it is desired to maintain similar nozzle pressure. It is further contemplated that each nozzle head 72 may be different, may be similar, or may be some combination of similar and different nozzle heads. Nozzle head 72 may also be configured to direct fluid into contact with filter support 12 in predetermined pattern, such as, for example, a stream, cone, flat spray, or any other fluid pattern known in the art.

FIG. 5 depicts a side view of phosphate filtering apparatus 10. The outer end of support beam 54 may be connected to support 56 that may be connected to a stationary surface 74. Stationary surface 74 may be integral or separate from support 56 and may embody a stationary part of phosphate filtering apparatus 10, a stationary part of a facility that phosphate filtering apparatus 10 is located in, or another stationary object, not related to filter support 12 or phosphate filtering apparatus 10, suitable for mounting support beam 54 and support 56. Phosphate filtering apparatus 10 may also include a splash guard 76 that may be located inside and above outside wall 20 and may be configured to prevent fluid from leaving the area of filter support 12.

Phosphate filtering apparatus 10 may include at least one fluid supply 80 that may be configured to store the fluid. If the fluid is tap water, fluid supply 80 may be a tap water source. Phosphate filtering apparatus 10 may include a pump 82 for pressurizing fluid from fluid supply 80 and for delivering the fluid to first spray bar 32 via supply line 48 and fluid inlets 46A and 46B. Pump 82 may be configured to produce fluid flows of up to and including approximately 450 gallons per minute and may pressurize first spray bar 32 such that fluid may contact filter support 12 at least approximately 8,000 pounds per square inch. In one example, pump 82 may produce between approximately 1350 and 2250 horsepower. Second spray bar 34, third spray bar 40, and fourth spray bar 42 may receive fluid from the same or a different fluid supply 80 in a manner similar to that described for first spray bar 32. For example, a plurality of fluid supplies 80 and/or multiple pumps 82 may be provided. In this manner first pair of spray bars 36 may be fed from fluid supply 80 via pump 82, while a second pair of spray bars 44 may be fed from a separate fluid supply 80 via a separate pump 82.

In one embodiment, the nozzles 50 may be sized to direct 6.5 gallons per minute of fluid into contact with filter support 12 at least approximately 8,000 pounds per square inch of pressure. Depending on the configuration, the system pressure can be set to between about 5,000 and 8,000 pounds per square inch, and the system flow rate can be set to between about 450 and 900 gallons per minute, or any other pressure and flow rate suitable for accomplishing the task at hand.

FIG. 5 also depicts an underside 13 of filter support 12. Phosphate filtering apparatus 10 may include a vacuum chamber (not shown) configured to draw a vacuum on one side of filter support 12. In this manner, during filtering operations phosphoric acid may be drawn through the filter media and filter support 12 and delivered to a phosphoric acid storage device (not shown); and during cleaning operations the fluid used to clean filter support 12 may be drawn through filter support 12 and recycled or otherwise disposed of. The vacuum chamber may be constructed in a conventional manner and may include a pump for causing a pressure drop across the filter.

Phosphate filtering apparatus may also include a motor 61 configured to move filter support 12 in a cyclical motion. If the filter support has a circular table structure, such as depicted in FIG. 1, the motor may be configured to cause rotation motion of the table filter support 12. If the invention is employed with a belt filter apparatus, the motor may be configured to cause a filter belt to travel in a cyclical motion along a belt path. And if the invention is employed in a tilting pan apparatus, the motor may be configured to cause the tilt pan to cycle back and forth in a tilting manner.

Figure 6:
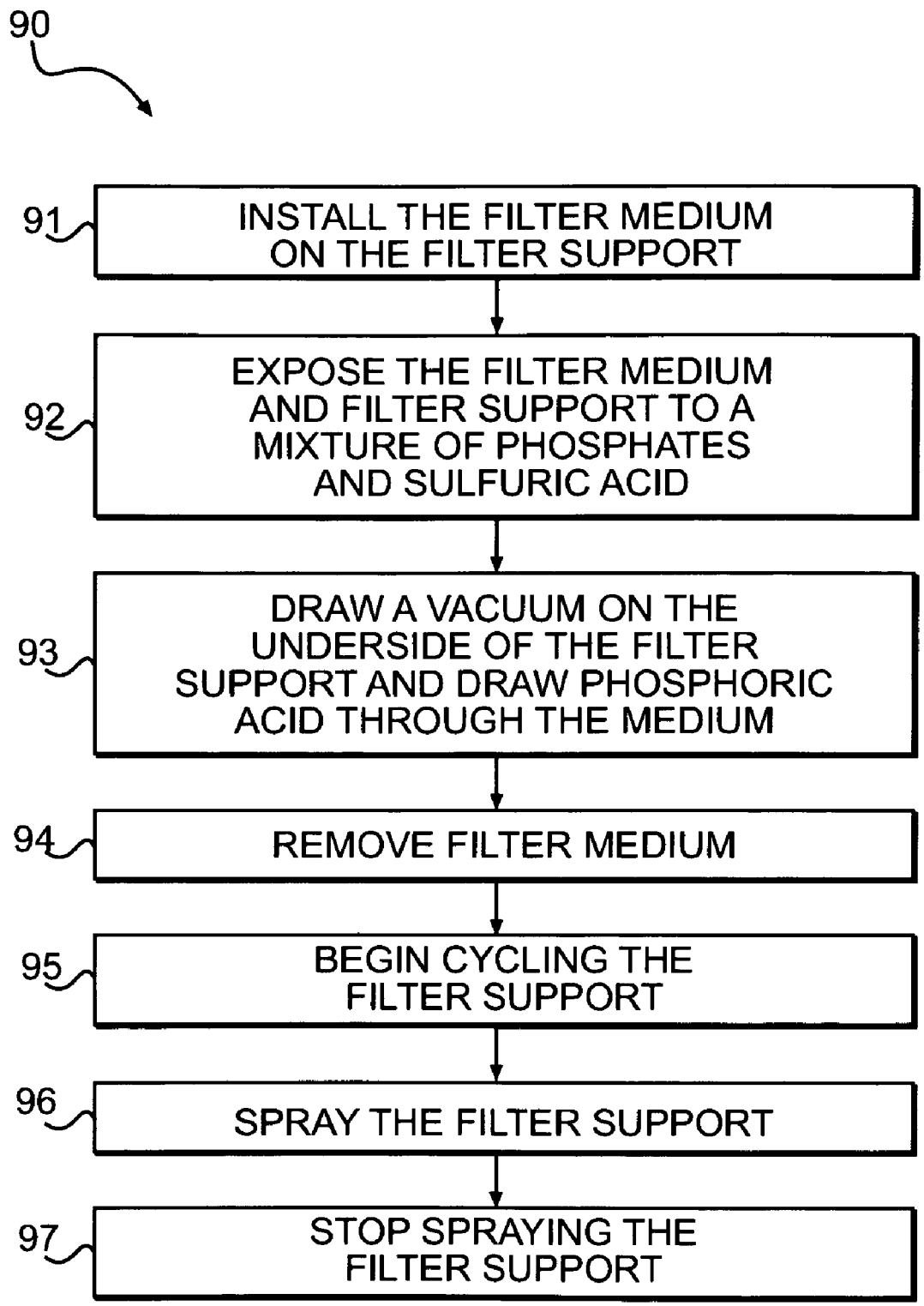
FIG. 6 is a process diagram illustrating an exemplary method of operating the filtering apparatus in accordance with one aspect of the invention of FIG. 1.

FIG. 6 is a flow diagram illustrating an exemplary disclosed method 90 for operating phosphate filtering apparatus 10. In step 91, an operator of phosphate filtering apparatus 10 may install the filter medium on filter support 12. Installing the filter medium may include resting the filter medium on filter support 12 and/or may include securing the filter medium to filter support 12 with clips. It is contemplated that the filter medium may be secured to filter support 12 by any means known in the art. The operator may cause filter support 12 to move in a cyclical motion. This may occur through the activation of motor 61. The cyclical motion of filter support 12 of a table filter may be rotational; however, other cyclical motions may include rotation and/or tilting of a tilting bed filter, movement of a belt in a belt filter, or any other cyclical motion known in the art. In step 92, an operator may supply a mixture of phosphates and sulfuric acid to the filter medium and filter support 12. The mixture of phosphates and sulfuric acid may result in the formation of phosphoric acid and calcium sulfate. In step 93, the operator may cause a vacuum to be drawn on a side of filter support 12 opposite the mixture. As a result the phosphoric acid may be drawn through the filter and may result in calcium phosphate accumulating in the filter medium, in openings 16, and on surface 14. Accumulation of calcium phosphate on surface 14 and in openings 16 of filter support 12 may cause the level of vacuum to drop outside of a satisfactory range and, as a result, the operator may stop the supply of the mixture of phosphates and sulfuric acid and may stop the rotation of filter support 12. Alternatively, the operator may stop the filtering operation for maintenance unrelated to the drop in vacuum, or any other reason known in the art.

In step 94, the operator may remove the filter medium. It is contemplated that they operator may terminate the vacuum drawn on filter support 12 before removing the filter medium. Alternatively, the operator may terminate the vacuum drawn on filter support 12 after removing the filter medium, or the operator may leave the vacuum drawn on filter support 12.

Removing the filter medium may include removing the clips that may secure the filter medium to filter support 12. It is contemplated that the clips may also accumulate calcium sulfate and may require filter support 12 to undergo a number of cleaning cycles (described below) before they may be removed. In step 95, the operator may cause filter support 12 to move in a cyclical motion by reactivating the motor. In step 96, the operator may initiate spraying by operating pump 82 to supply pressurized fluid to at least first spray bar 32 from fluid supply 80. The pressurized fluid supplied to first spray bar 32 may be directed against surface 14 and openings 16 of filter support 12. As filter support 12 travels through multiple cycles, (e.g. rotations), directing the pressurized fluid may result in a sweeping motion across surface 14 and openings 16 of filter support 12. In step 97, spraying may be terminated after a majority of the openings are substantially free of calcium sulfate blockage. Such termination may occur manually, or may occur automatically after a predetermined time has elapsed. For an exemplary table filter, such as with phosphate filtering apparatus 10, it has been found that rotating filter support 12 one rotation every 3 to 4 minutes and spraying for 4 hours (8,000 pounds per square inch; 500 gallons per minute), is sufficient to substantially free the openings 16 and surface 14 of filter support 12 of calcium sulfate blockage.

In a second example, a tilting pan filter that utilizes clips to secure the filter medium may be used. In the second example, the filter support 12 may be moved through its tilting cycle once approximately every 2 minutes while being sprayed for approximately 1 hour before the clips are substantially free of calcium phosphate and may be removed. Filter support 12 of the tilting pan filter may then be cycled once approximately every 2 minutes while being sprayed additionally for approximately 2 hours.

The operator may then stop the cyclical motion of filter support 12 and may reinstall the filter medium, after which the operator may reinitiate the cyclical motion of filter support 12, may cause a vacuum to be drawn on filter support 12, and may reinitiate the supply of the mixture of phosphates and sulfuric acid to the filter medium. The cleaning times provided above for the table filter and tilting pan filter are exemplary only. Filter support 12 may be sprayed for more or less time given certain factors such as the amount of blockage, vacuum drop, visual inspection, or any other factor known in the art.

Figure 7:
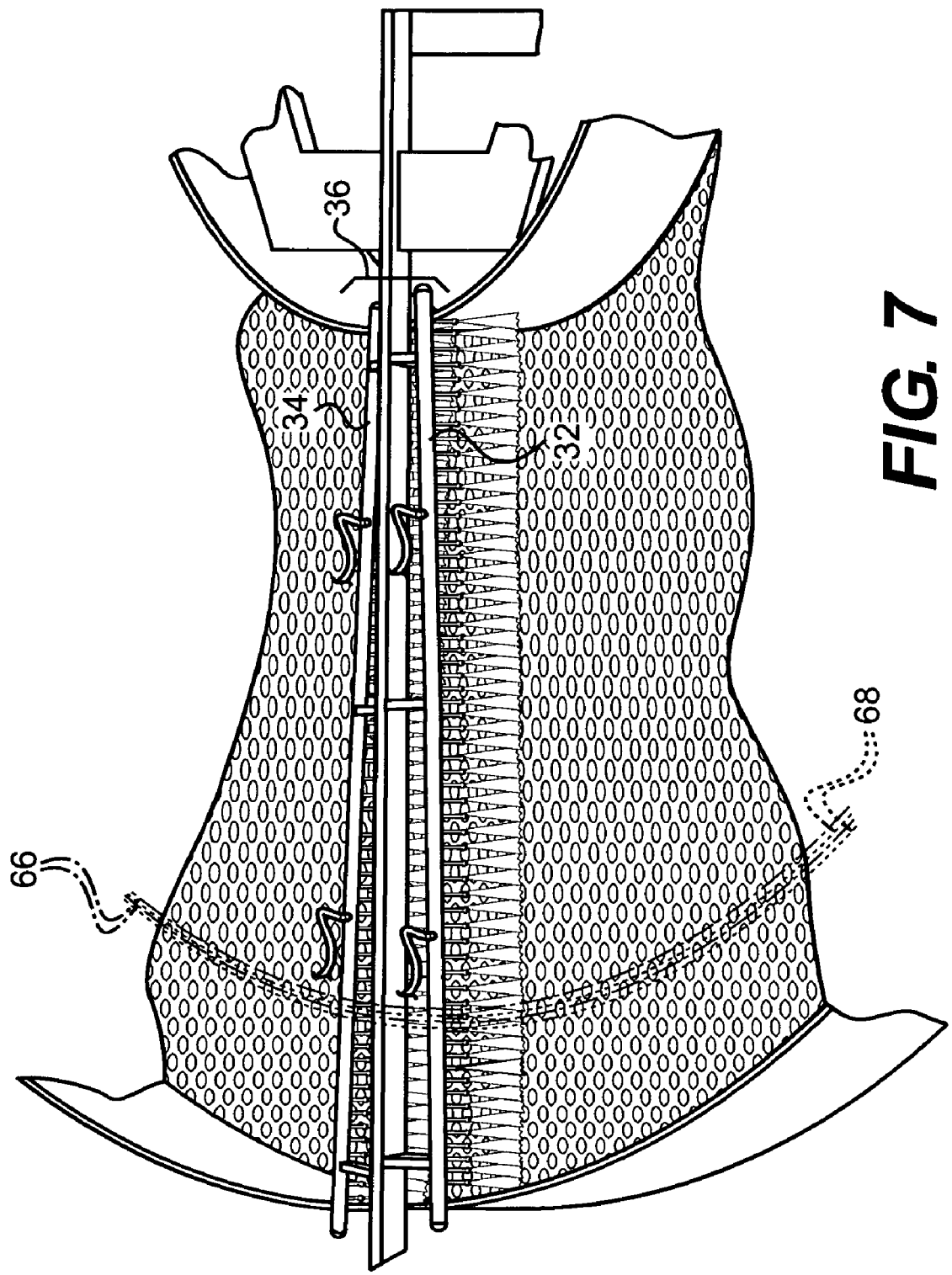
FIG. 7 is a partial cutaway in perspective view, illustrating a second exemplary filtering apparatus in accordance with the invention.

FIG. 7 depicts an alternative embodiment of phosphate filtering apparatus 10. Similar to phosphate filtering apparatus 10 of FIG. 1, phosphate filtering apparatus 10 of FIG. 7 includes a first spray bar 32 and a second spray bar 34 that form a single pair of spray bars 36. Unlike the phosphate filtering apparatus 10 of FIG. 1, a second pair of spray bars is not provided, and the single pair extends the entire radial dimension of the filter support.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of operating a phosphate filtering apparatus, the method comprising:
   providing a rotary table filtering apparatus including a movable filter support having a plurality of openings therein;
   providing at least one spray bar disposed in a substantially fixed orientation adjacent to and above a surface of the filter support;
   installing a cloth filter on the movable filter support;
   exposing the cloth filter to a mixture of phosphates and sulfuric acid, thereby resulting in phosphoric acid and calcium sulfate;
   drawing a vacuum on one side of the movable filter support opposite the mixture to draw the phosphoric acid through the cloth filter and the filter support, and resulting in calcium sulfate accumulation in the openings of the movable filter support;
   removing the cloth filter from the filter support;
   causing the filter support to move in a cyclical manner while the cloth filter is removed from the filter support;
   spraying, using a plurality of nozzles in the at least one spray bar, pressurized fluid toward the surface of the filter support while the filter support travels through multiple cycles of movement such that the spraying results in a sweeping motion across the surface of the filter support; and
   terminating spraying after substantially all of the openings in the filter support are substantially free of calcium sulfate blockage.

2. The method of claim 1, wherein the spray bar is maintained in a substantially fixed orientation adjacent the surface of the filter support during the step of drawing a vacuum.

3. The method of claim 2, wherein the fluid is sprayed at a pressure of greater than about 5,000 psi.

4. The method of claim 2, further comprising supplying pressurized fluid to the plurality of spray bars using multiple supply conduits, and wherein spraying simultaneously occurs through multiple spray bars.

5. The method of claim 1, wherein providing at least one spray bar includes providing a pair of spray bars, the spray bars being in a side by side relationship with respect to their lengths.

6. The method of claim 1, wherein providing at least one spray bar includes providing two pair of spray bars, the spray bars of each pair being in a side by side relationship with respect to their lengths.

7. The method of claim 6, wherein providing at least two pair of spray bars includes providing a plurality of nozzles on each spray bar, the nozzles of one spray bar in a pair being offset from the nozzles of the other spray bar in a pair.

8. The method of claim 6, wherein during a movement cycle, each of said pair of spray bars directs pressurized fluid toward only a portion of the filter support.

9. The method of claim 8, wherein a cycle of movement is a rotational cycle, and the spray bars are generally fixed in a radial orientation with respect to an axis of rotation of the filter support.

10. The method of claim 9, wherein the spray bars of each pair are disposed at a reflex angle with respect to each other.

11. The method of claim 9, wherein the filter support has a generally round shape.

12. The method of claim 11, wherein the support has a radius of over 15 feet, and wherein the spray bars are each over 7 feet in length.

13. The method of claim 1, wherein the fluid is sprayed at an angle perpendicular to the surface of the filter support.

14. The method of claim 1, wherein the fluid is sprayed at a flow rate of between 450 gallons per minute and 900 gallons per minute.

15. The method of claim 1, further comprising stopping the supply of the mixture before removing the filter.

16. A method for operating a phosphate filtering apparatus the method comprising:

providing a rotary table filtering apparatus including a movable filter support having a plurality of openings therein;

providing a plurality of spray bars disposed in a substantially fixed orientation adjacent to and above a surface of the movable filter support, each of the plurality of spray bars including plurality of nozzles directed at an angle substantially perpendicular to the surface of the filter support, and wherein at least two of the plurality of the spray bars are oriented at a reflex angle with respect to each other;

installing a cloth filter on the filter support;

exposing the cloth filter to a mixture of phosphates and sulfuric acid, thereby resulting in phosphoric acid and calcium sulfate;

drawing a vacuum on one side of the filter support opposite the mixture to draw the phosphoric acid through the cloth filter and the filter support, and resulting in calcium sulfate accumulation in the openings of the filter support;

stopping of a supply of the mixture of phosphates and sulfuric acid to the cloth filter;

removing the cloth filter from the filter support;

causing the filter support to rotate while the cloth filter is removed from the filter support;

spraying, using the plurality of nozzles in the spray bars, pressurized fluid toward the surface of the filter support while the filter support travels in multiple rotations such that the spraying results in a sweeping motion across the surface of the filter support, and wherein during spraying, fluid is supplied through the nozzles at a pressure of at least approximately 5000 lbs per square inch; and terminating spraying after substantially all of the openings in the filter support are substantially free of calcium sulfate blockage.

17. The method of claim 16, wherein the filter support has a radius of over 15 feet, and wherein the spray bars are each over 7 feet in length.

18. The method of claim 16, wherein the plurality of nozzles are spaced approximately 3 1/2 inches apart from each other.

19. The method of claim 16, wherein the step of stopping the supply of mixture occurs after a vacuum pressure drop is sensed.

20. The method of claim 16, wherein during the step of causing the filter support to rotate, the filter support is rotated for a period of approximately 4 hours.

21. The method of claim 16, wherein the filtering apparatus further includes a center portion, and wherein the center portion is stationary relative to the filter support.

22. The method of claim 16 wherein during spraying liquid is supplied at a rate of at least approximately 450 gallons per minute.

* * * * *